Patented Aug. 13, 1935

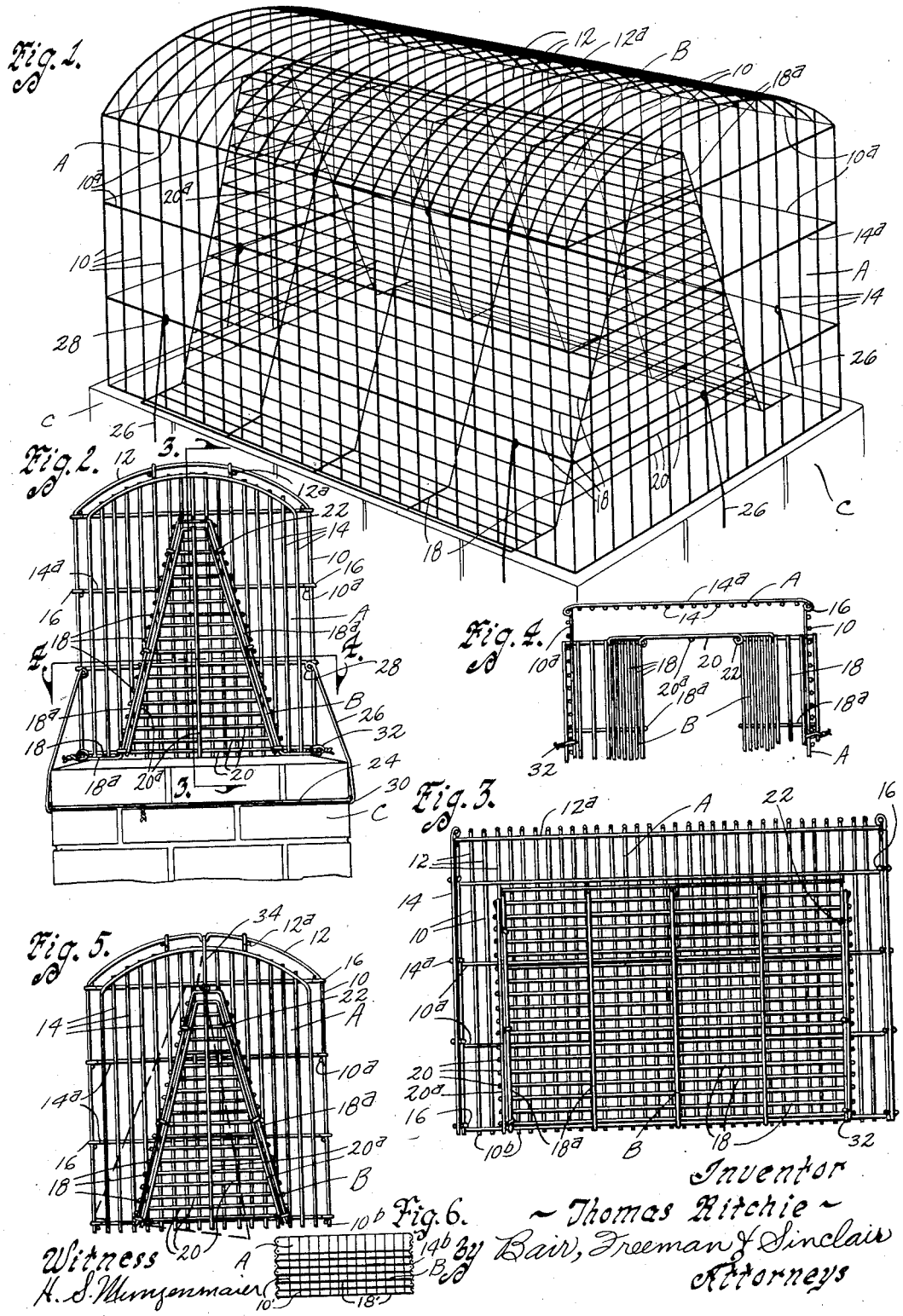

2,011,200

UNITED STATES PATENT OFFICE 2,011,200

SPARK ARRESTER

Thomas Ritchie, Oskaloosa, Iowa

Application May 21, 1934, Serial No. 726,682

3 Claims. (Cl. 183—98)

An object of my invention is to provide a spark arrester for chimneys and the like which is simple and durable, yet of such construction that it eliminates clogging which is a failure common to most spark arresters.

A further object is to provide a spark arrester comprising spaced inner and outer elements, each being formed essentially of parallel wires, the wires of one element being arranged at right angles relative to the wires of the other element.

Still a further object is to provide a spark arrester which effectively riddles the sparks and absorbs their heat so as to prevent them from passing out of the arrester in a glowing state, thus effectively preventing them from doing any damage.

More particularly, it is my object to provide a spark arrester comprising an inner wire cage with horizontally arranged wires and an outer wire cage with vertically arranged wires, so that comparatively large fragments of burning substance carried upwardly through a chimney can be effectively riddled and will pass through the spark arrester without clogging it, yet the arrester will effectively kill the glow of the sparks to thus prevent damage.

With these and other objects in view my invention consists in the construction, arrangement and combination of the various parts of my arrester whereby the objects contemplated are attained, as hereinafter more fully set forth, pointed out in my claims, and illustrated in the accompanying drawing, in which:

Figure 1 is a perspective view of a spark arrester embodying my invention and showing it applied to the top of a chimney or the like.

Figure 2 is a vertical transverse sectional view through the spark arrester, showing the manner of anchoring it to the chimney.

Figure 3 is a longitudinal sectional view on the line 3—3 of Figure 2.

Figure 4 is a horizontal sectional view on the line 4—4 of Figure 2.

Figure 5 is a view similar to Figure 2 showing a modified form of the invention; and Figure 6 is a view similar to Figure 3 except that it is diagrammatic, showing another modified form of the invention.

On the accompanying drawing, I have used the reference character C to indicate a chimney. My spark arrester comprises an outer cage A and an inner cage B. The outer cage A is of rectangular box-like construction as disclosed on the drawing. Its sides are formed of closely spaced, substantially parallel, vertically arranged wires 10 tied together by widely spaced horizontally arranged wires 10a. The top is preferably curved and comprises wires 12 which are extensions of the wires 10 and which are tied together by widely spaced wires 12a. In manufacturing the spark arrester, the sides 10 and the top 12 are formed as an integral unit and these units can be nested for shipping purposes.

The outer cage A further includes end walls comprising vertical closely spaced wires 14 tied together by horizontal widely spaced wires 14a. The ends may be shipped flat.

Upon installing the spark arrester, the outer cage A is assembled by bending the ends of the wires 14a around the end wires 10 of the sides of the cage as indicated at 16.

The inner cage B comprises a series of horizontally arranged closely spaced wires 18 tied together by widely spaced vertically arranged wires 18a. The wires 18a are bent in the shape of an angle with a flat apex and diverging feet at its lower end. Ends are provided for the inner cage B which are substantially triangular in shape and comprise closely spaced horizontal wires 20 and substantially vertical tie wires 20a which are widely spaced. The ends of the wires 20a as indicated at 22 are bent around the end wires 18a when assembling the inner cage. The portion of the inner cage comprising the wires 18 and 18a can be shipped nested, while the ends comprising the wires 20 and 20a can be shipped flat.

The lower ends of the wires 10 extend downwardly beyond the lower wire 10a as indicated at 10b in Figure 3. The purpose of this construction is so that these downwardly extending ends can retain the inner cage B in proper position on the chimney C when the outer cage is anchored thereon as will now be described.

A single anchor wire 24 is wrapped around the chimney C, preferably in one of the mortar grooves as illustrated in Figure 2. It is connected by tie wires 26 with the outer cage A. The tie wires may have eyes 28 extending around certain of the wires 10a and 14a of the cage A as illustrated and eyes 30 around the anchor wire 24. Thus the outer cage is effectively positioned on the upper end of the chimney and the depending wire ends 10b effectively retain the inner cage in position, although additional means can be provided for positioning one with respect to the other, such as by wire loops 32 twisted around the lower wires 10a and 18a of the cages A and B.

The inner cage is made in the shape of a rectangular pyramid so that its sides slope slightly relative to the vertical and sparks which are carried vertically upward by the draft in the chimney, in attempting to pass between the wires 18a, are quite effectively riddled to kill their glow. Long particles coming up through the chimney which would ordinarily clog a spark arrester formed of ordinary square wire mesh I have found will pass through the special mesh I provide instead of clogging the arrester.

By arranging the parallel wires of one cage at right angles to those of the other cage, the same effect as with ordinary square mesh as far as passage of sparks is obtained, with the additional advantage that clogging is eliminated. I have proven this is true in actual experimental use of the invention.

In Figure 5, I show a modified form of the invention in which the inner cage, instead of being anchored, is arranged for swinging relative to the outer cage. This can be accomplished by two or three wire links 34 pivotally connected with the outer cage and either secured or pivotally connected to the inner cage. A dotted position is shown to which the inner cage can swing, such swinging being caused by draft and wind air currents and resulting in effectively knocking soot off the cages, thus keeping them well cleaned.

In Figure 6, I show a modified form of the invention which is cheaper to construct than the form shown in Figure 1. The outer cage A is shown by light lines, while the inner cage B is shown by heavy lines. The outer cage comprises sides and a top, the same as the cage A in Figure 1, with the exception that the ends as indicated at 14b are of half inch mesh wires or what is sometimes termed "hardware cloth with a mesh of two to the inch".

The essential parallel spaced wires of the outer cage are indicated at 10', the wires corresponding to 10a in Figure 1 being omitted for clarity of the drawing. The essential wires of the inner cage are indicated at 18', those corresponding to the wires 18a of Figure 1 being omitted for clarity. It will be noted that the wires 18' extend from one end 14b to the other of the outer cage, thus eliminating the necessity of providing ends as at 20—20a in Figure 4.

This form of the invention is cheaper to construct inasmuch as it omits two parts of the construction shown in the previous figures (the ends of the inner cage B), yet retains the essential spark riddling elements which are the two opposite slanted sides of the inner cage B with its parallel spaced wires arranged at right angles to the parallel spaced wires on the sides and top of the outer cage.

Some changes may be made in the construction and arrangement of the parts of my arrester without departing from the real spirit and purpose of my invention, and it is my intention to cover by my claims, any modified forms of structure or use of mechanical equivalents, which may be reasonably included within their scope.

I claim as my invention:

1. A spark arrester comprising a pair of cages, one within the other and spaced therefrom, at least two opposite sides of said cages being formed of wire mesh having substantially parallel closely spaced wires extending in one direction and substantially parallel widely spaced wires extending across the closely spaced wires, the closely spaced wires of said inner cage being horizontal, the sides of said inner cage sloping slightly relative to the vertical and the closely spaced wires of the outer cage being vertical.

2. A spark arrester for chimneys and the like comprising a pair of elements, one within and spaced from the other and each having slotted openings, the slots of one element extending at right angles relative to the slots of the other element and means for supporting said spark arrester on a chimney, said means comprising a wire around said chimney and tie wires extending from said wire to said outer element, said inner element having flanges confined between said outer element and the top of said chimney.

3. In a spark arrester, adapted to be mounted on top of a chimney and to receive smoke and sparks discharged upwardly therefrom, a woven wire, cage-like member having upright peripheral side walls and having reticulated baffle-like members oppositely inclined with relation to each other and to the upright side walls, collectively extended across the entire area of the path of the products of combustion passing upwardly through said cage-like member.

THOMAS RITCHIE.